United States Patent [19]
Blyler, Jr. et al.

[11] Patent Number: 6,016,703
[45] Date of Patent: Jan. 25, 2000

[54] NONINVASIVE LOAD AND PRESSURE SENSOR SYSTEM UTILIZING THE PRINCIPLE OF REFRACTION OF LIGHT THROUGH A COMPRESSIBLE FLUID

[75] Inventors: Lee Landis Blyler, Jr., Basking Ridge, N.J.; Scott E. Farleigh, Denver, Colo.; Gary J. Grimes, Brimingham, Ala.

[73] Assignee: Lucent Technologies Inc., Murray Hill, N.J.

[21] Appl. No.: 09/197,651

[22] Filed: Nov. 23, 1998

[51] Int. Cl.[7] .................. G01J 1/56; G01J 5/46; G01L 7/00; G01L 1/24
[52] U.S. Cl. .................. 73/705; 250/231.19; 73/800
[58] Field of Search ........................ 73/705, 800, 426, 73/1.59, 1.71, 1.72, 49.2, 49.3, 64.43; 250/231.19, 231.1

[56] References Cited

U.S. PATENT DOCUMENTS

| | | | |
|---|---|---|---|
| 5,425,273 | 6/1995 | Chevalier | 73/705 |
| 5,637,803 | 6/1997 | Schalk et al. | 73/705 |

*Primary Examiner*—William Oen

[57] ABSTRACT

The present noninvasive load and pressure sensing system makes use of a transparent pressure vessel that is filled with a compressible fluid, whose refractive index changes as a function of the pressure applied to the compressible fluid to redirect the path of a light beam that is transmitted through the transparent pressure vessel. An incident beam of coherent monochromatic light is applied to a transparent segment of a wall of the transparent pressure vessel, where this incident light beam is refracted by the compressible fluid contained in the transparent pressure vessel. The refracted light beam traverses the transparent pressure vessel and exits the transparent pressure vessel at a point along the opposite wall of the transparent pressure vessel as determined by the refractive index of the compressible fluid, which is determined by the pressure of the compressible fluid. The pressure of the compressible fluid is controlled by using a scale comprising a compressible bladder that is fluidically connected to the transparent pressure vessel. The weight placed on the scale varies the pressure of the compressible fluid and thus its refractive index. Thus, by measuring the exit point of the refracted light beam on the wall of the transparent pressure vessel the pressure, and thus the weight of the object placed on the scale, can be determined.

10 Claims, 2 Drawing Sheets

NONINVASIVE LOAD AND PRESSURE SENSOR SYSTEM UTILIZING THE PRINCIPLE OF REFRACTION OF LIGHT THROUGH A COMPRESSIBLE FLUID

CROSS-REFERENCE TO RELATED APPLICATIONS

This application is related to U.S. patent application Ser. No. 09/?, titled Method and Apparatus for Redirecting a Light Beam, which is filed on the same date as the present application.

FIELD OF THE INVENTION

This invention relates to a noninvasive load and pressure sensor system that uses a compressible fluid to redirect the path of a light beam, thereby enabling the measurement of the pressure by determining the deflection of the light beam.

PROBLEM

It is a problem in the field of load and pressure sensing systems to measure the pressure of a fluid in a noninvasive manner. Mechanical systems suffer from the risk of leakage at the pressure sensing element interface. Mechanical pressure sensing elements may also lack the accuracy required to measure a wide range of pressure changes. A noninvasive pressure sensor is a preferred system architecture.

One such noninvasive pressure sensor application is disclosed in U.S. Pat. No. 5,721,612, issued Feb. 24, 1998 to Samuel J. Anderson, wherein an optical pressure sensor is implemented using an optical link to couple light from an optical interferometer to a pressure sensing element and to couple the reflected light back to an interferometer over another optical link. The optical links use a set of holographic reflectors to guide the light through the optical link. In addition, the pressure sensing element comprises a Fabry-Perot cavity which responds to pressure changes by changing the length of the optical path, thereby causing phase changes in the reflected light beam. The detected phase changes in this signal can be used to determine the pressure that is applied to the pressure sensing element. However, this noninvasive pressure sensing system is complex.

SOLUTION

The present noninvasive load and pressure sensing system solves the above noted problems and represents an advance in the art in that it makes use of a transparent pressure vessel that is filled with a compressible fluid, whose refractive index changes as a function of the pressure applied to the compressible fluid to redirect the path of a light beam that is transmitted through the transparent pressure vessel. An incident beam of coherent monochromatic light is applied to a transparent segment of a wall of the transparent pressure vessel, where this incident light beam is refracted by the compressible fluid contained in the transparent pressure vessel. The refracted light beam traverses the transparent pressure vessel and exits the transparent pressure vessel at a point along the opposite wall of the transparent pressure vessel as determined by the refractive index of the compressible fluid, which is determined by the pressure of the compressible fluid. The pressure of the compressible fluid is controlled by using a scale comprising a compressible bladder that is fluidically connected to the transparent pressure vessel. The weight placed on the scale varies the pressure of the compressible fluid and thus its refractive index. Thus, by measuring the exit point of the refracted light beam on the wall of the transparent pressure vessel the pressure, and thus the weight of the object placed on the scale, can be determined.

DETAILED DESCRIPTION

Figure 1:
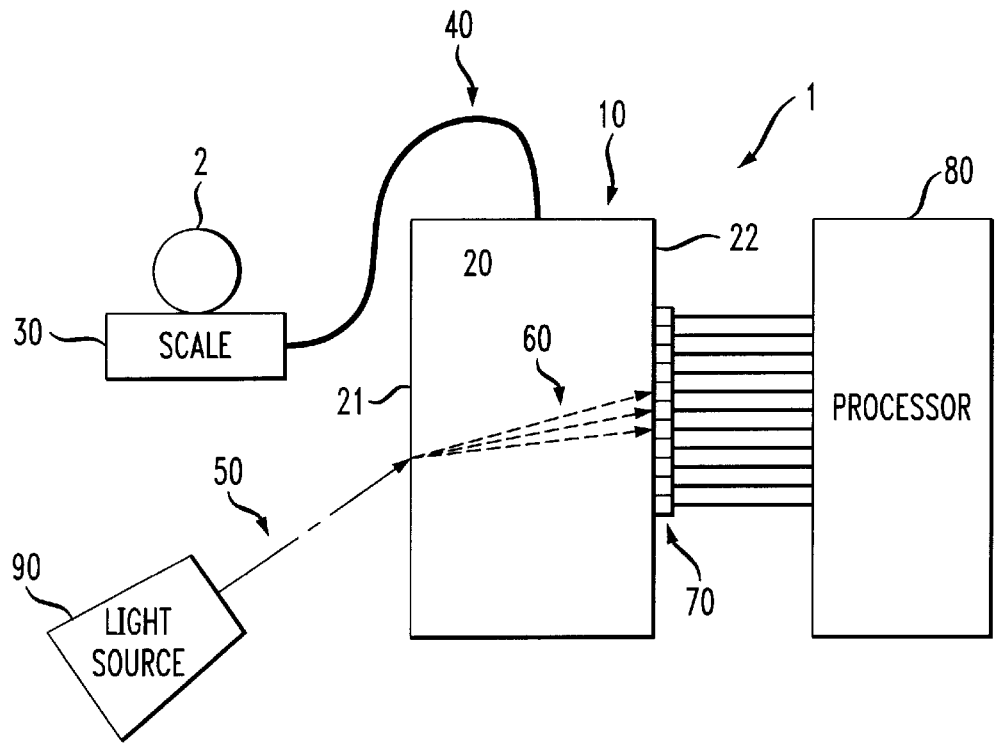
FIG. 1 illustrates in block diagram form the overall architecture of the present noninvasive load and pressure sensing system.

The overall architecture of the present noninvasive load and pressure sensing system 1 is illustrated in block diagram form in FIG. 1. The noninvasive pressure sensing system 1 comprises a transparent pressure vessel 10 that is filled with a compressible fluid 20, whose refractive index changes as a function of the pressure applied to the compressible fluid 20 to redirect the path of an incident light beam 50 that is transmitted through the transparent pressure vessel 10. An incident beam of coherent monochromatic light 50 is generated by light source 90 and applied to a transparent segment of a wall 21 of the transparent pressure vessel 10. The light source 90 produces a beam of coherent monochromatic light, and can be a laser or a light guide, such as an optical fiber, that transmits the beam of coherent monochromatic light from some remotely located light source. In either case, the use of a coherent monochromatic light beam is preferred to produce a uniform redirection of the incident light beam in the transparent pressure vessel 10 and to have narrow dispersion of the light beam as it traverses the transparent pressure vessel 10. The minimization of dispersion of the light beam is important to avoid ambiguous output signals produced by the light receiving elements 70 which are described below.

Figure 3:
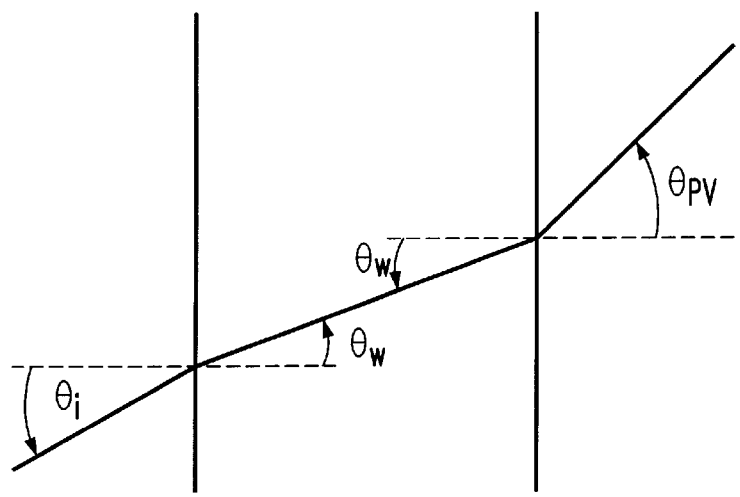
FIG. 3 illustrates the refraction of the light beam within the wall of the pressure vessel.
Figure 2:
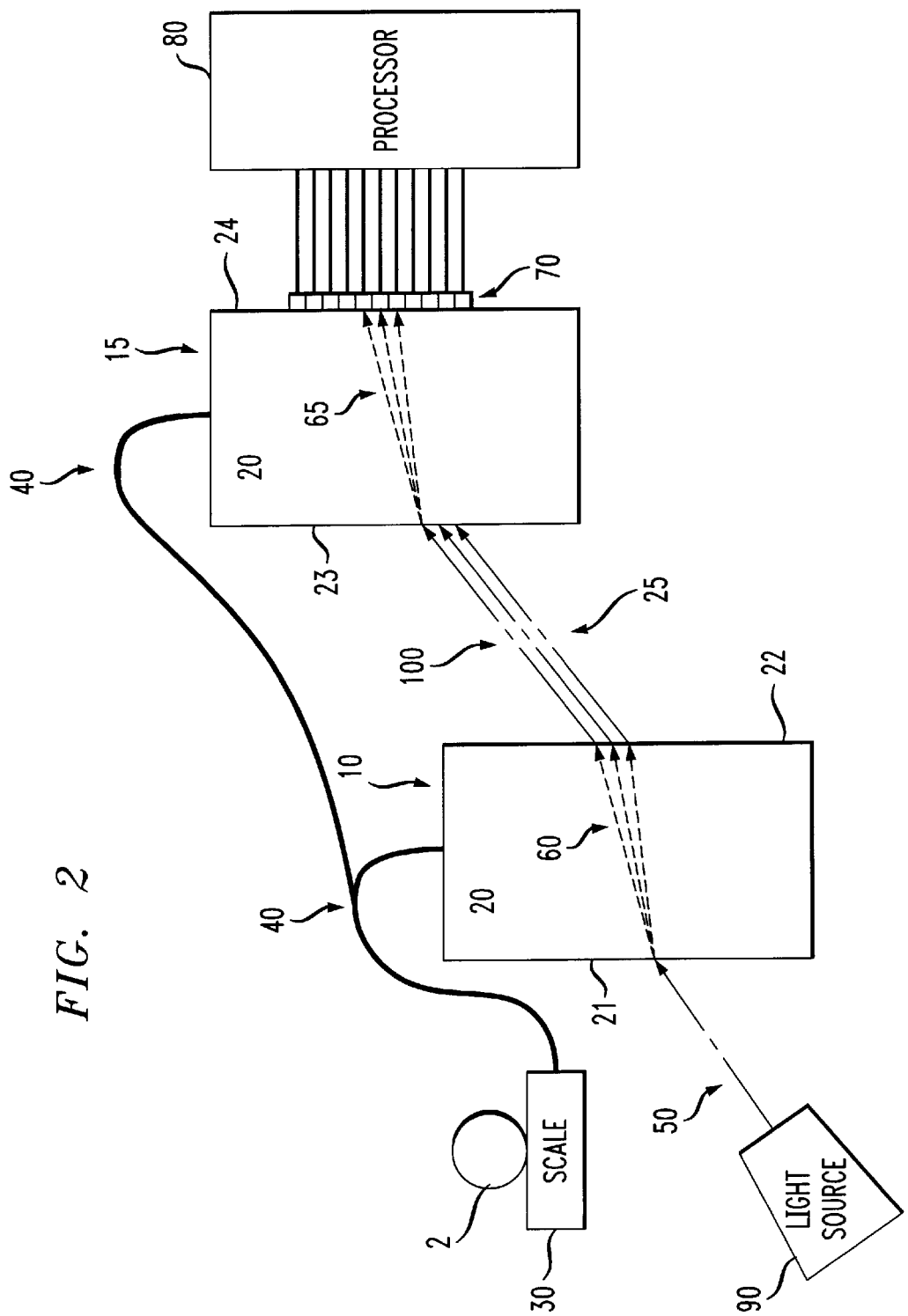
FIG. 2 illustrates in block diagram form an alternative embodiment of the present noninvasive load and pressure sensing system.

FIG. 3 illustrates the refraction of the incident light beam 50 within the wall 21 of the pressure vessel 10. Since the walls of the transparent pressure vessel 10 have a finite thickness, they serve to refract the incident light beam 50 as the incident light beam 50 traverses the extent of wall 21. As shown in FIG. 3, each interface between two materials of different index of refraction causes the incident light beam 50 to be refracted. As an example, the ambient environment around the transparent pressure vessel 10 is assumed to be air or a vacuum, with an index of refraction of approximately n=1.0. The transparent pressure vessel 10 is constructed of a transparent, yet sturdy material, such as plastic or glass, which has an index of refraction of between 1.3 and 1.6. Finally, the compressible fluid 20 within the transparent pressure vessel 10 has an index of refraction and, for example, in the case of sulfur dioxide, n=1.000686. Accordingly, Snell's Law provides that:

$$n_{air} \sin \theta_i = n_{gas} \sin \theta_{pv} = n_{wall} \sin \theta_w$$

Thus, by rearranging terms:

$$\theta_{PV} = \sin^{-1}\left[\sin \theta_i \frac{n_{air}}{n_{gas}}\right]$$

The index of refraction of a fluid is dependent on both temperature and pressure. The index of refraction of a compressible fluid for a given temperature t is given by the formula:

$$n_t - 1 = \frac{n_0 - 1}{1 + \alpha t} * \frac{p}{760}$$

where $n_t$ is the index of refraction for temperature t, $n_0$ is the index of refraction for temperature=0, $\alpha$ is the coefficient of expansion of the gas with temperature and p is the pressure of the gas in millimeters of mercury. Thus, as can be seen from this equation, the index of refraction of the compressible fluid (also termed "gas") is linearly related to the applied pressure if the temperature is maintained a constant. Thus:

$$n_{air}(t, P) - 1 = \frac{[n_{air}(0, 760) - 1]}{1 + \alpha_{air}t}\left(\frac{P_{air}}{760}\right)$$

$$n_{gas}(t, P) - 1 = \frac{[n_{gas}(0, 760) - 1]}{1 + \alpha_{gas}t}\left(\frac{P_{gas}}{760}\right)$$

Using this relationship, the angle $\theta_{PV}$ can be determined in terms of the pressure, index of refraction and incident angle $\theta_i$.

Let $n_{air}(0,760)=n_{oair}$ $n_{gas}(0,760)=n_{ogas}$

Assuming thermal equilibrium:

then:

$$\theta_{pv} = \sin^{-1}\left[\frac{1 + \alpha_{air}t + [n_{oair} - 1]\frac{P_{air}}{760}}{1 + \alpha_{gas}t + [n_{ogas} - 1]\frac{P_{gas}}{760}}\left(\frac{1 + \alpha_{gas}t}{1 + \alpha_{air}t}\right)\sin\theta_i\right]$$

If air is at 1atm :

$$\theta_{pv} = \sin^{-1}\left[\frac{1 + \alpha_{air}t + [n_{oair} - 1]}{1 + \alpha_{gas}t + [n_{ogas} - 1]\frac{P_{gas}}{760}}\left(\frac{1 + \alpha_{gas}t}{1 + \alpha_{air}t}\right)\sin\theta_i\right]$$

If the gas in the pressure vessel is air:

$$\theta_{pv} = \sin^{-1}\left[\frac{\frac{\sin\theta_i}{(1 - P/760)}}{n_{oair} + \alpha_{air}t}\right]$$

The selection of a fluid that has a high base index of refraction results in the greatest deflection of the refracted light beam. Since the deflection of the light beam is small in magnitude and a function of the wavelength of the incident light beam, a coherent monochromatic source of light is necessary to ensure that the resultant deflection of the light beam is solely a result of the refractive index of the compressible fluid and can also be precisely determined without significant expansion of the incident light beam.

The incident light beam 50 is refracted by the compressible fluid 20 contained in the transparent pressure vessel 10. The refracted light beam 60 traverses the transparent pressure vessel 10 and exits the transparent pressure vessel 10 at a point along the opposite wall 22 of the transparent pressure vessel 10 as determined by the refractive index of the compressible fluid 20, which is determined by the pressure of the compressible fluid 20. To illustrate the variability of the refraction of the incident light beam 50, a plurality of refracted light paths 60 are illustrated as dotted lines in FIG. 1 to show that the path of the refracted light beam 60 can vary.

The pressure of the compressible fluid 20 is controlled by the weight of an object 2 that is placed upon the scale 30 comprising a compressible bladder that is fluidically connected 40 to the transparent pressure vessel 10. The weight of the object 2, thus the load on the system, can be determined by the pressure of the compressible fluid 20 and thus its refractive index, which linearly varies the exit point of the refracted light beam 60 on the wall 22 of the transparent pressure vessel 10 . The light sensing elements 70 can be aligned in a linear array, with the output of each of the linear array of light sensing elements 70 being connected to a processor 80. The processor 80 measures the magnitude of the signal produced by each of the light sensing elements 70 and can thereby determine the position of the refracted light beam 60. The processor 80 is equipped with software to execute the above-noted equation to thereby determine the weight of the object 2 placed on scale 30 by means of the resultant deflection of the refracted light beam 60 representing the pressure of the compressible fluid 20.

ALTERNATE EMBODIMENT

A greater deflection of the refracted light beam 60 of FIG. 1 can be achieved by the use of a plurality of the transparent pressure vessels 10, 15 which function to expand the deflection of the incident light beam 50 and enable the system to function as a pressure sensing system. In particular, the incident light beam 50 is refracted by the compressible fluid 20 at the interface between the transparent wall 21 and the ambient environment in a predetermined direction, in a single dimension. Thus, the range of light beam deflections that can be effected by this noninvasive pressure sensing system 1 are linear in nature and cover a predetermined range, as a function of the range of pressures that can be applied to the compressible fluid 20. Thus, the output light beam 100 from this first transparent pressure vessel 10 can be transmitted to another transparent pressure vessel 15 that is also connected to the scale 30 and fluid conduit 40 to again refract the light beam, thereby extending the deflection of the incident light beam by passing the light beam through successive transparent pressure vessels 10, 15. Thus, the once refracted light beam exits the first transparent pressure vessel 10 via wall 22 and traverses the space 25 between the intervening transparent pressure vessels 10, 15 to enter the second transparent pressure vessel 15 via wall 23. Once the light beam traverses the pressurized compressible fluid 20 contained in the second transparent pressure vessel 15, it exits the wall 24 where it is incident on light receiving elements 70 that are mounted on the second wall 24 of the second transparent pressure vessel 15.

SUMMARY

Thus, the noninvasive laod and pressure sensor system uses a transparent pressure vessel filled with a compressible fluid, whose refractive index changes as a function of the pressure applied to the compressible fluid, to redirect the path of an incident beam of coherent monochromatic light that is applied to a transparent segment of a wall of the transparent pressure vessel. The incident light beam is refracted by the compressible fluid contained in the transparent pressure vessel and exits the transparent pressure vessel at a point along the opposite wall of the transparent pressure vessel as determined by the refractive index of the compressible fluid.

What is claimed:

1. A noninvasive load and pressure sensor system, comprising:

means for containing a compressible fluid and having first and second transparent apertures located on respective opposing walls thereof;

means, fluidically connected to said means for containing, for applying a pressure of said compressible fluid;

means for applying a monochromatic coherent light beam to said compressible fluid via said first transparent aperture; and light receiving means, located juxtaposed to said second transparent aperture, for receiving said monochromatic coherent light beam as it exits said means for enclosing via said second transparent aperture.

2. The noninvasive load and pressure sensor system of claim 1 wherein said means for applying comprises:

scale means, having an inlet and an outlet, for generating a predetermined pressure to said compressible fluid in response to a weight applied thereto; and conduit means for fluidically interconnecting said outlet of said scale means with said means for containing.

3. The noninvasive load and pressure sensor system of claim 1 wherein said light receiving means comprises:

a plurality of light detector means for generating electrical signals in response to receipt of said light beam.

4. The noninvasive load and pressure sensor system of claim 1 wherein said light receiving means comprises:

a plurality of light transmission means for retransmitting said light beam in response to receipt of said light beam.

5. The noninvasive load and pressure sensor system of claim 1 further comprising:

second means for containing a compressible fluid and having first and second transparent apertures located on respective opposing walls thereof, fluidically connected to said means for applying and juxtaposed to said means for containing for receiving in said first wall of said second means for containing a light beam that exits said second wall of said means for containing.

6. A method for noninvasively measuring a load, comprising the steps of:

containing a compressible fluid in a pressure vessel having first and second transparent apertures located on respective opposing walls thereof;

applying a pressure of said compressible fluid via a conduit fluidically connected to said pressure vessel;

applying a monochromatic coherent light beam to said compressible fluid via said first transparent aperture; and receiving at a light receiver, located juxtaposed to said second transparent aperture, said monochromatic coherent light beam as it exits said pressure vessel via said second transparent aperture.

7. The method of noninvasively measuring a pressure of claim 6 wherein said step of regulating comprises:

activating a scale, having an inlet and an outlet, to generate a predetermined pressure to said compressible fluid, in response to a weight applied thereto.

8. The method for noninvasively measuring a pressure of claim 6 wherein said step of receiving comprises:

positioning a plurality of light detectors on said second wall to generate electrical signals in response to receipt of said light beam.

9. The method for noninvasively measuring a pressure of claim 6 wherein said step of receiving comprises:

positioning a plurality of light transmission elements on said second wall to retransmit said light beam in response to receipt of said light beam.

10. The method for noninvasively measuring a pressure of claim 6 further comprising the step of:

containing said compressible fluid in a second pressure vessel having first and second transparent apertures located on respective opposing walls and juxtaposed to said first pressure vessel for receiving in said first wall of said second pressure vessel for containing a light beam that exits said second wall of said pressure vessel.

* * * * *